(12) United States Patent
Muhonen (10) Patent No.: US 7,158,801 B1
(45) Date of Patent: Jan. 2, 2007

(54) TRANSMISSION OF POINT-TO-MULTIPOINT SERVICES TO A DESTINATION AREA

(75) Inventor: Ahti Muhonen, Hirvihaara (FI)

(73) Assignee: Nokia Corporation, Espoo (FI)

( * ) Notice: Subject to any disclaimer, the term of this patent is extended or adjusted under 35 U.S.C. 154(b) by 1174 days.

(21) Appl. No.: 09/669,171

(22) Filed: Sep. 25, 2000

Related U.S. Application Data (63) Continuation of application No. PCT/FI99/00250, filed on Mar. 26, 1999.

(30) Foreign Application Priority Data

Mar. 26, 1998 (FI) ..................... 980684

(51) Int. Cl.
*H04B 15/00* (2006.01)
(52) U.S. Cl. .................... 455/503; 455/500; 455/456.1
(58) Field of Classification Search ................ 455/500, 455/422, 525, 433, 414.1, 445; 370/254, 370/328, 338, 401, 408
See application file for complete search history.

(56) References Cited

U.S. PATENT DOCUMENTS

| | | | | |
|---|---|---|---|---|
| 5,530,963 A | * | 6/1996 | Moore et al. ............... | 709/243 |
| 5,862,345 A | * | 1/1999 | Okanoue et al. ............ | 709/238 |
| 5,862,490 A | * | 1/1999 | Sasuta et al. ............... | 455/525 |
| 6,128,509 A | * | 10/2000 | Veijola et al. ............. | 455/556.1 |
| 6,236,657 B1 | * | 5/2001 | Andersson et al. ......... | 370/400 |
| 6,252,857 B1 | * | 6/2001 | Fendick et al. ............ | 370/254 |

FOREIGN PATENT DOCUMENTS

WO          WO98/49845          11/1998

OTHER PUBLICATIONS

Tim O. Eckardt, Thomas Magedanz and Radu Popescu; "Beyond IN and UPT—A personal Communications Support System Based on TMN Concepts", IEEE Journal on Selected Areas in Communications, vol. 15, No. 7, Sep. 1997, pp. 1308-1314.
International Search Report for PCT/FI99/00250.

* cited by examiner

*Primary Examiner*—Temica Beamer
*Assistant Examiner*—Joy Contee
(74) *Attorney, Agent, or Firm*—Squire, Sanders & Dempsey L.L.P.

(57) ABSTRACT

A system, methods, an area register and a service center for transmitting point-to-multipoint services to a geographical destination area that can be indicated by using a logical name. Logical names must be mapped to distribution addresses. The system therefor comprises memory means (AR) for mapping each predetermined logical name (71) to one or more network element addresses (72,73) of the system. In addition, the system comprises one or more service centers which are arranged to inquire, in response to a received service request, the memory means (AR) for the addresses (72, 73) of the network elements corresponding to the logical name (71) of the destination area and to transmit the point-to-multipoint service to the geographical destination area via the network elements. The service is transmitted to cells in conventional manner via network nodes, while a service request is transmitted to other service centers.

14 Claims, 3 Drawing Sheets

TRANSMISSION OF POINT-TO-MULTIPOINT SERVICES TO A DESTINATION AREA

This application is a continuation of international application serial number PCT/FI99/00250, filed 26 Mar. 1999.

BACKGROUND OF THE INVENTION

The invention relates to areal point-to-multipoint services in a mobile communication system and particularly to mapping of a logical name of a geographical destination area of a service to network element addresses in order to allow one and the same service request to be used for reaching service areas of even a plurality of service centres controlling point-to-multipoint services.

Mobile communication systems have been developed in an answer to a need to reach people when they are not at a fixed telephone terminal. With the increased use of various data transmission services in offices, different data services have been also introduced into mobile communication systems. Mobile communication networks, in turn, provide the user with an efficient access network to the actual data networks for mobile data transmission. For this purpose, various new forms of data services are being designed for existing and future mobile communication networks. Digital mobile communication systems, such as the pan-European mobile communication system GSM (Global System for Mobile Communication), support particularly well mobile data transmission.

Figure 1:
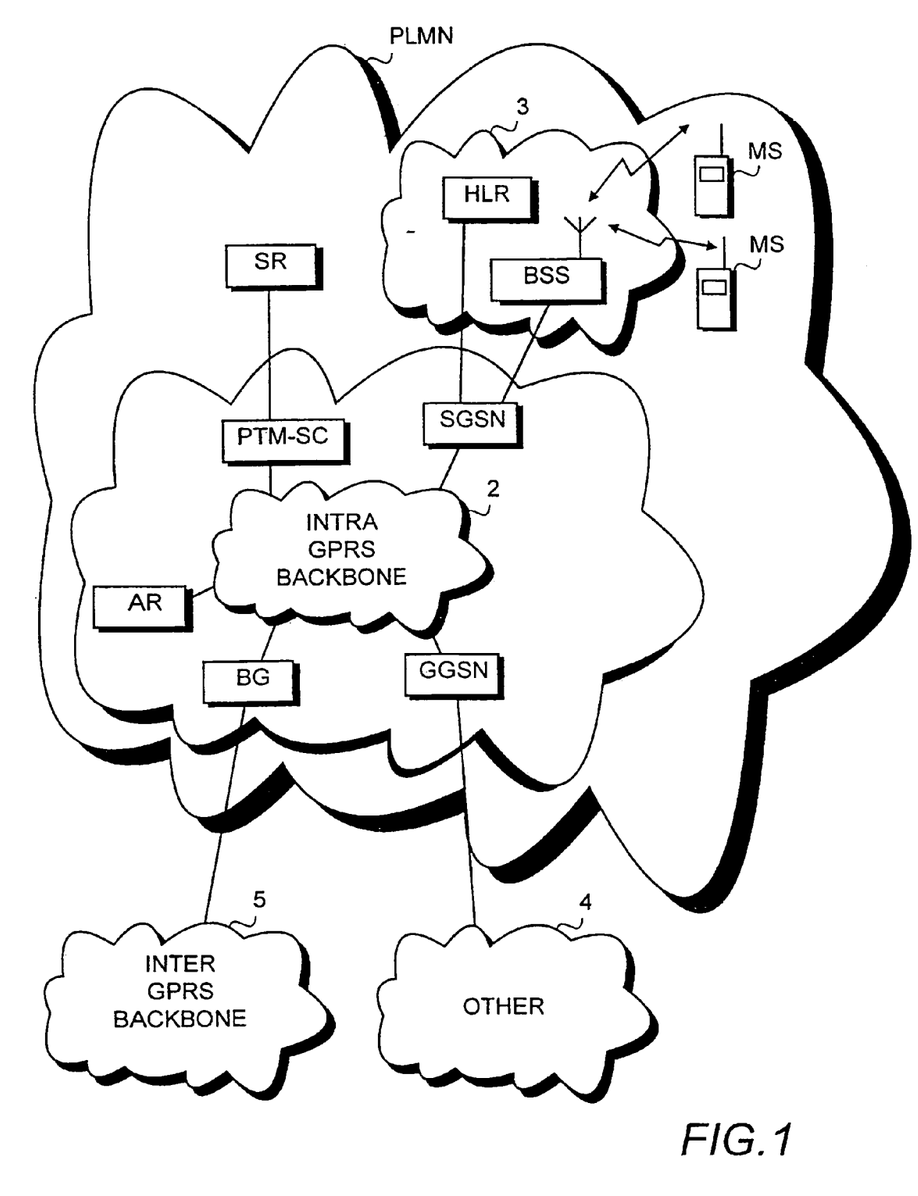
FIG. 1 is a block diagram illustrating the essential elements of a packet radio system of the invention.

The General Packet Radio Service GPRS is a new service in the GSM system and one of the objects of GSM Phase 2+ standardization at ETSI (European Telecommunication Standard Institute). The GPRS allows packet data transmission to be provided between mobile data terminals and external data networks, with the GSM network functioning as an access network. One of the requirements set to the GPRS is that it must interwork with different kinds of external data networks, such as the Internet or the X.25. In other words, the GPRS and the GSM network should be able to serve all users, irrespective of the data network the users wish to access through the GSM network. This means that the GSM network and the GPRS must support and process various kinds of network addressing and data packet formats. The processing of data packets also comprises their routing in the packet radio network. In addition, the users should be able to roam from the GPRS home network to another GPRS network, the operator backbone network of which may support a different protocol (CLNP, for example) than the home network (X.25, for example). The GPRS network architecture is illustrated in FIG. 1.

The GPRS service supports both point-to-point and point-to-multipoint transmissions. The function of a point-to-multipoint transmission is to allow a sender to transmit data to recipients in a destination area by using one and the same service request. The term 'data' in this application refers to any information relayed in a digital telecommunication system. The information may comprise digitized speech, inter-computer data traffic, telefax data, short program code segments, etc. The destination area is a geographical area determined by the sender either in the service request or when the initiation of a point-to-multipoint transmission is informed. The destination area can be determined either as a list of cells or a logical name. Since one logical name can be used to cover a large number of cells, most often the destination area is determined as a logical name. To control point-to-multipoint transmissions the GPRS network typically comprises a Point-To-Multipoint Service Centre PTM-SC, which is an essential element in the point-to-multipoint service. The centre receives service requests from a Service Requester and transmits the service to its service area. Actual point-to-multipoint services supported by the GPRS are Point-to-Multipoint Multicast PTM-M and Point-To-Multipoint Group Call PTM-G. A PTM multicast is broadcast in all the cells belonging to the destination area. A PTM group call is broadcast in the cells of the destination area in which at least one subscriber registered into the group is located.

A problem with the above described system is that it fails to determine how to map efficiently logical names in order to one or more network element addresses allowing the service to be transmitted to an entire geographical destination area that may cover a plurality of service areas of different packet radio networks or PTM service centres.

BRIEF DESCRIPTION OF THE INVENTION

An object of the invention is thus to provide a method and an equipment implementing the method so as to allow the above mentioned problem to be solved. The object of the invention is achieved with a mobile communication system comprising at least one mobile communication network; at least one service centre for point-to-multipoint services; and at least one network node through which a point-to-multipoint transmission is transmitted to cells belonging to a destination area, the geographical destination area of the point-to-multipoint service being indicated in the system as a logical name. The system is characterized in that it comprises memory means for mapping each predetermined logical name to one or more network element addresses of the system, and that a service centre is arranged to inquire, in response to a received service request, from the memory means the addresses of the network elements corresponding to the logical name of the destination area and to transmit a point-to-multipoint service via the network elements to the geographical destination area.

The invention also relates to a method, which can be utilized in the system of the invention, for transmitting a point-to-multipoint service of a mobile communication system to a destination area of the service indicated as a logical name in a service request, the mobile communication system comprising at least one mobile communication network, at least one service centre for point-to-multipoint services, and at least one network node through which the point-to-multipoint service is transmitted to the cells located within the destination area. The method of the invention is characterized by determining logical names for geographical destination areas of the service; maintaining an address list for each logical name in the mobile communication network, the address list being used for mapping a logical name to one or more network element addresses of the system; receiving a service request at a first service centre, the service request indicating the destination area as a logical name; mapping the logical name by means of the address list to one or more network element addresses; checking each address and, if an address is the address of a second service centre, forwarding the service request to the service centre concerned or, if an address is the address of a network node, transmitting the service via the node to those cells in the service area of the node which belong to the destination area of the service.

The invention also relates to another method, which can be utilized in the system of the invention, for transmitting a point-to-multipoint service of a mobile communication system to a destination area of the service, at least part of the destination area being outside the service area of a first service centre, the first service centre receiving a service request from a service provider. The method of the invention is characterized by setting up a connection from the first service centre to a second service centre; maintaining information about the address of the second service centre and its service area at the first service centre; receiving the service request indicating the destination area at the first service centre; checking at the first service centre whether at least part of the destination area is within the service area of the second service centre; and, if yes, forwarding the service request to the second service centre.

The invention further relates to an area register that can be utilized in the system of the invention. The area register forms part of a mobile communication system comprising at feast one network, the network comprising a service centre for point-to-multipoint services for transmitting a point-to-multipoint service to a geographical destination area indicated in a service request, the destination area being indicated as a logical name. The area register of the invention is characterized in that it comprises a list of logical names for at least one service centre and at least one network element address list of the system corresponding to each logical name in order to allow a logical name to be mapped to at least one system network element address; and processing means for receiving inquiries concerning the logical names and for replying to the inquiries.

The invention further relates to a service centre for point-to-multipoint transmissions, which can be utilized in the system of the invention, i.e. a service centre for transmitting point-to-multipoint services in a mobile communication system to a geographical destination area of a service, the service centre comprising reception means for receiving a service request, the service request having a destination area that can be indicated as a logical name. The service centre of the invention is characterized in that it comprises inquiry means for mapping the logical name given in the service request to at least one address for a network element of the system; and transmission means for transmitting the service to the destination area via each network element.

The invention is based on the idea that at the service centre that receives the service request the geographical area indicated by the logical name is linked to other service centres and/or to network nodes of the receiving service centre and to cells located within the area of the network nodes. The service is transmitted to the cells in a conventional manner through the network nodes, whereas a service request is forwarded to other service centres. The invention thus provides the advantage that logical names can be efficiently and reliably mapped to distribution addresses of the service. A further advantage the invention provides is that logical names are very easy to determine, and one and the same destination area can have various different logical names. Another advantage is that with a single service request the service requester can cover a wide area. The area does not need to be limited in any way according to network borders, network node service areas or other predetermined areas of the network, such as location areas; Furthermore, the network operator can add a new service centre to the network and divide the service area of a former service centre into service areas of the former and the new service centre in such a way that from the service requester's point of view the network functions as if the service areas had not been divided at all.

In a preferred embodiment of the invention the service request is transmitted unchanged to other service centres. This provides the advantage that the system does not need different service request messages according to who is the sender of the service request, or whether the service centre receiving the service request is located in the same network or in a different network; one and the same service request is always valid.

In another preferred embodiment of the invention the destination area of the service request can be indicated by using intermediate operators together with a plurality of logical names. This provides manifold alternatives for the determining of the destination area compared with the determining of destination areas by using only one logical name in a request.

In another preferred embodiment of the invention the service centre replaces the destination area of the service request with a destination area of the second service centre before the service request is transmitted to the destination area. This simplifies the determining of logical names in different networks and provides a means for preventing the service request to be transferred back and forth between the service centres.

In another preferred embodiment of the invention the service areas of the service centres overlap at least to some extent, the common area then belonging only to the service area of the service centre with a smaller load. This provides the advantage that the operator can secure an equal quality of service irrespective of the load of the first service centre that receives the service request.

The preferred embodiments of the mobile communication system, method, area register and service centre of the invention are disclosed in the accompanying independent claims.

LIST OF DRAWINGS

In the following the invention will be described in greater detail in connection with preferred embodiments and with reference to the accompanying drawings, in which.

DETAILED DESCRIPTION OF THE INVENTION

In the following the preferred embodiments of the invention will be described with reference to GPRS packet radio networks without, however, restricting the invention to any specific packet radio system. It is to be noted that a packet radio network only provides a physical connection between a PTM service centre and a service receiver, therefore its detailed operation and structure are not essential to the invention. Specifications for mobile communication systems in general and for the GPRS system in particular develop rapidly. The location of different functionalities in the network elements may change. Therefore all words and expressions used should be interpreted in their broadest sense; they are used to describe and not to limit the invention.

FIG. 1 shows one example of a GPRS packet radio network PLMN. A GPRS operational environment 1 comprises one or more subnetwork service areas interconnected by an Intra-PLMN GPRS Backbone Network 2. A subnetwork comprises a number of packet data service nodes SN, which in this context will be referred to as serving GPRS support nodes SGSN, each connected to a GSM mobile communication network 3—typically to base station systems BSS—in such a way that the network can provide a packet service for mobile data terminals MS via several base stations, i.e. cells. The intermediate mobile communication network 3 provides packet-switched data transmission between a support node and mobile data terminals. In a cellular packet radio network, each support node SGSN controls packet service within one or more cells. A data terminal MS located in a cell communicates over the mobile communication network with the support node SGSN into the service area of which the cell belongs to. Different subnetworks are in turn connected to an external data network 4, for example to a public switched data network PSPDN, an Internet network or an integrated services digital network ISDN via specific GPRS gateway support nodes GGSN. The GPRS thus allows packet transmission to be provided between mobile data terminals and external data networks, with the GSM network 3 functioning as an access network. Different mobile communication networks are interconnected by an Inter-PLMN Backbone Network 5. The GPRS operational environment 1 between the mobile communication networks comprises a Border Gateway BG. The GPRS subscriber information and routing information are stored in a home location register HLR of the GSM network.

To control point-to-multipoint transmissions the GPRS network typically comprises a Point-To-Multipoint Service Centre PTM-SC. The service centre PTM-SC is an essential element in the point-to-multipoint service and responsible for the geographical routing of messages. It receives service requests from a Service Requester SR and takes care of transmitting the service via a support node or support nodes SGSN within its service area. In other words, it handles the scheduling of messages, their transmission and retransmission according to given user parameters. Some of the service centre operations can be decentralized into other network elements, an example of which is a support node SGSN which can at least to some extent take care of the geographical routing, for example. For the time being, GPRS specifications do not determine how a PTM service centre is connected to a network. FIG. 1 shows one alternative in which the PTM service centre is connected to the internal backbone network 2. The PTM service centre of the invention will be described in greater detail in connection with FIG. 6.

In the system of the invention the Service Requester SR is not limited in any way. An essential aspect is that service requests relating to similar services are always transmitted in a similar format to the service centre PTM-SC. The format naturally depends on the point-to-multipoint service used. The service requester can thus be an independent service provider transmitting its service requests via other networks 4. The service requester SR can also have a direct connection to a service centre PTM-SC located in the network, as shown in the example of FIG. 1. The service requester can also be a network element or a terminal the service request of which is forwarded to the service centre PTM-SC. The service requester can also be a second service centre PTM-SC. The service request is similarly processed irrespective of whether it is received from the same network or from another network. In the following PTM service centres which receive service requests from service centres of another network and which can, correspondingly, send requests to them are referred to as gateway service centres. PTM service centres receiving service requests only from the PTM service centres of the same network are called dedicated service centres.

A mobile communication network of the invention also comprises at least one area register AR for controlling the geographical routing of the service. The area register AR can be a separate network element as shown in FIG. 1. It can also be integrated into the service centre PTM-SC. In addition, part of the area register can be decentralised into serving support nodes SGSN, for example. To balance the load of an individual area register, the network can also comprise a plural number of identical area registers AR. The updating of identical area registers must be centralized. If the network comprises a plurality of service centres PTM-SC, each of them can have a separate area register AR or they can use a common area register.

Figure 2:
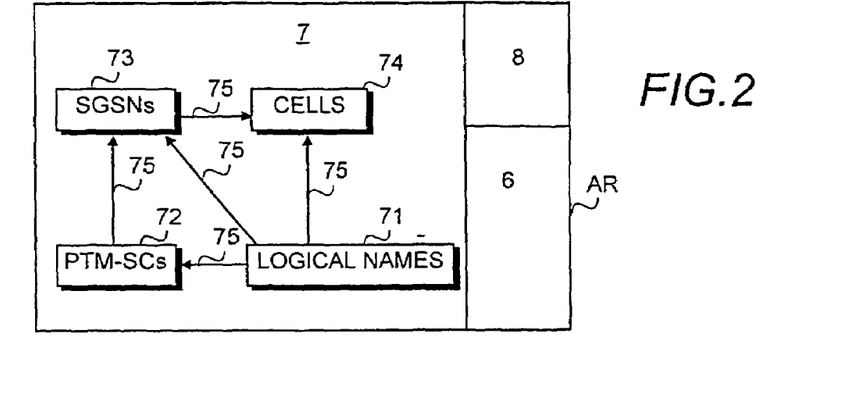
FIG. 2 is a block diagram illustrating an area register of a first preferred embodiment of the invention.

FIG. 2 is a block diagram illustrating an area register AR of a first preferred embodiment of the invention, the register being a centralized independent area register. In this case the service centre PTM-SC does not know the cell structure of the network or how logical names are mapped to network element addresses. Correspondingly, the support node SGSN does not know the correspondence between logical names and the cells within the support node's service area. Data located in a centralized area are easily updated. Other embodiments allow the functions and information of the area register to be decentralized and thereby network signalling load to be reduced. The area register AR comprises an application part 6, database 7 and communication part 8. The communication part 8 receives inquiry messages concerning logical names and replies to the network element that supplied an inquiry. Via the communication part the operator or the PTM service centre can also update the data in the database. In addition, the communication part 8 can be arranged to transmit to the application part 6 information indicating the network element the inquiry was received from.

The database 7 comprises four separate lists: list 71 of the logical names, list 72 of the service centres PTM-SC, list 73 of the support nodes SGSN and list 74 of the cells. The operator determines a number of logical names that can be used as a name for a destination area of a point-to-multipoint service. In addition, each subscriber can have a separate group of logical names forming part of the subscriber information of the GPRS service. The logical names can cover areas that are either partly or completely within the area of another mobile communication network. All the logical names concerned are included in the logical names list 71. The list 72 of the service centres PTM-SC comprises the service centres located in the mobile communication network concerned, and those service centres of other mobile communication networks that operate as gateway service centres. The list 73 of the support nodes SGSN comprises the serving support nodes SGSN of the mobile communication network concerned. Correspondingly, the cell list 74 comprises the cells of the mobile communication network concerned. The database also comprises the mapping of information between different lists as shown by arrows 75. Each logical name is provided with a separate virtual list which in this context will be referred to as a name-specific list. If the geographical area covered by a logical name, or part of it, is within the area of the network concerned, the name-specific list comprises all the cells of the mobile communication network concerned that are determined for the geographical area corresponding to the logical name; all support nodes SGSN within the area of which the above mentioned cells belong to; and all service centres PTM-SC of the mobile communication network concerned within the service area of which the above mentioned support nodes SGSN belong to. If the geographical name covered by the logical name, or part of it, is within the area of another mobile communication network, the name-specific list comprises the addresses of the service centres PTM-SC of the mobile communication networks into the area of which the area covered by the logical name concerned extends to. Correspondingly, each home network service centre PTM-SC included in the list 72 of the service centres PTM-SC has a separate virtual list of the support nodes SGSN belonging to its service area. Furthermore, each support node SGSN included in the list 73 of the support nodes SGSN has a separate virtual list comprising each cell that belongs to its routing area. The arrows 75 in the database shown in FIG. 2 illustrate the contents of the virtual lists described.

The application part 6 carries out the inquiry operations of the database and uses them to compile a reply that is forwarded by the connection part. Examples of the replies are described in connection with FIG. 5. In the first preferred embodiment the destination area included in the service request can be formed of a plural number of different logical names and their intermediate logical operators, such as a logical AND and a logical NOT. Other suitable logical operators can also be used. The application part 6 identifies the logical operators and uses them when making database inquiries and formulating the reply. The application part 6 preferably also comprises a hierarchical structure of the logical names shown in FIG. 3. With the structure it searches for the logical names it will use for making the database inquiries described in connection with FIG. 3.

A minimum requirement for the area register of the invention is that in addition to the logical names list 71 it comprises either the service centres list 72 or the cell list 74 and the support nodes list 73. If the area register only comprises the logical names list 71 and the service centres list 72, it can only serve a service centre which does nothing but transmits service requests to other service centres, for example to the service centre of an independent service requester. If the area register only comprises the logical names list 71, the cell list 74 and the support nodes list 73, it cannot transmit service requests to other service centres, but only transmit the service to a destination area that is within its service area.

Figure 3:
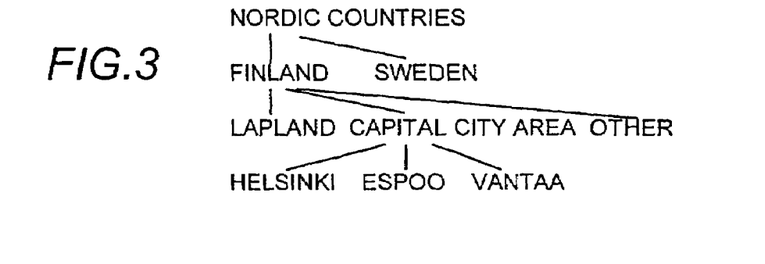
FIG. 3 illustrates logical names shown as a hierarchical structure.

Logical names are preferably determined as a hierarchical structure shown in the example of FIG. 3. Names that could be used, in addition to geographical names, include network operator names; for example, subsets of 'Finland' could be 'Radiolinja' and 'Sonera'. Using the hierarchical structure together with logical operators allows logical names to be used in a flexible and varied manner to determine a destination area. In addition, logical names are then fairly simple to add and remove. The first preferred embodiment offers the following three different alternatives for determining the destination area of the service. Alternative 1 is 'Finland NOT other'; alternative 2 is 'Lapland AND capital city area'; alternative 3 is 'Lapland AND Helsinki AND Espoo AND Vantaa'. This structure allows a destination area Comprising multiple different areas not dependent on each other to be determined for the point-to-multipoint service.

The area register AR can utilize the above hierarchical structure in a second preferred embodiment to map a logical name.

Figure 4:
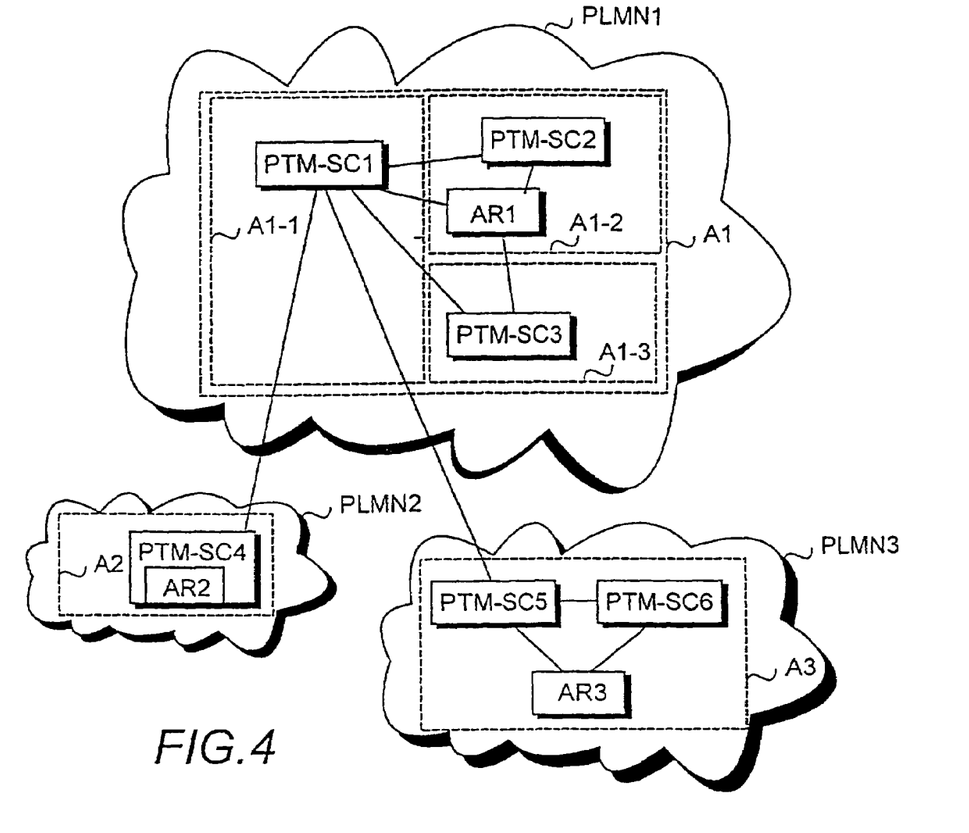
FIG. 4 is a block diagram illustrating a system of the invention.

FIG. 4 is a block diagram illustrating an example of a system of the invention, the system comprising three separate mobile communication networks PLMN1, PLMN2 and PLMN3. The operator of the mobile communication network PLMN1 has service agreements with the operators of the networks PLMN2 and PLMN3. In the mobile communication network PLMN1, a service centre PTM-SC1 operates as a gateway service centre within a service area A1 of the entire mobile communication network. In addition, the point-to-multipoint service area of the centre is an area A1-1. A service centre PTM-SC2 serves an area A1-2 and, correspondingly, a service centre PTM-SC3 an area A1-3. In reality the service areas cover the network completely, but for the sake of clarity they are shown separately. The network A45 comprises one centralized area register AR1. In the mobile communication network the service request from the service requester of the mobile communication network PLMN1 is preferably routed to the service centre in which the operator has determined the service requester to be located, irrespective of the service centre in the service area of which the service requester is when transmitting the service request. For example, the service requests coming from a service requester of a mobile terminal located in the area A1-1 are always received at the PTM-SC2 because in the subscriber information, the PTM-SC2 is determined as the service centre of the service requester.

The mobile communication network PLMN2 comprises only one service centre, PTM-SC4, the service area A2 of which covers the entire network. The PTM-SC4 is a gateway service centre and into the service centre PTM-SC4 is integrated an area register AR2 of the mobile communication network PLMN2.

The mobile communication network PLMN3 comprises two service centres, the service areas of which both comprise the entire network. A service centre PTM-SC5 functions as a gateway service centre. FIG. 4 shows an example of a dedicated service centre PTM-SC6 which receives service requests only from the service centre PTM-SC5. The service centre PTM-SC5 is a load controlling service centre; it decides when the service centre PTM-SC6 is to be used to balance the load on the centres. An area register AR3 of the mobile communication centre PLMN3 is a centralized register. The service centre PTM-SC5 determines the service centre into the service area of which the common service area A3 belongs to; it cannot belong to the areas of both at the same time. When the service centre PTM-SC5 receives a service request concerning the area A3, it either relays the request to the service centre PTM-SC6 or transmits it to the area A3.

The following example illustrates the mapping of a logical name to network element addresses in the first preferred embodiment in the mobile communication system according to FIG. 4. Let us assume that the mobile communication networks PLMN1 and PLMN3 both cover the whole of Finland and the PLMN2 is a mobile communication network covering Sweden. The area A1-1 of the mobile communication network PLMN1 is capital city area, the area A1-2 is Lapland and the area A1-3 is Other. The name-specific list of a logical name 'Nordic countries' of the area register AR1 for the service centre PTM-SC1 comprises the addresses of the service centres PTM-SC2, PTM-SC3, PTM-SC4 and PTM-SC5, the support nodes serving the area A1-1 and the cells within the area A1-1. The name-specific list of the logical name 'Nordic countries' of the area register AR1 for the service centre PTM-SC2 comprises the support nodes serving the area A1-2 and the cells within the area A1-2. Correspondingly, the name-specific list of the logical name 'Nordic countries' of the area register AR1 for the service centre PTM-SC3 comprises the support nodes serving the area A1-3 and the cells within the area A1-3. The name-specific list of the logical name 'Nordic countries' of the area register AR2 comprises the support nodes serving the area A2 and the cells within the area A2. The name-specific list of the logical name 'Nordic countries' of the area register AR3 comprises the support nodes serving the area A3 and the cells within the area A3. In other words, one and the same logical name has a service-area-specific set of addresses within the system. In the second preferred embodiment the service request is not transmitted unchanged to other service centres, but the logical name is replaced with a second logical name or a cell list, and therefore a service-area-specific set of addresses is not needed for the logical names. For example, the service centre PTM-SC1 receives a service request the destination area of which is 'Nordic countries'. It transmits the service request to the service centre PTM-SC2. The transmitted service request is otherwise similar to the original one, except that the destination area 'Nordic countries' has been replaced with 'Lapland'.

Figure 5:
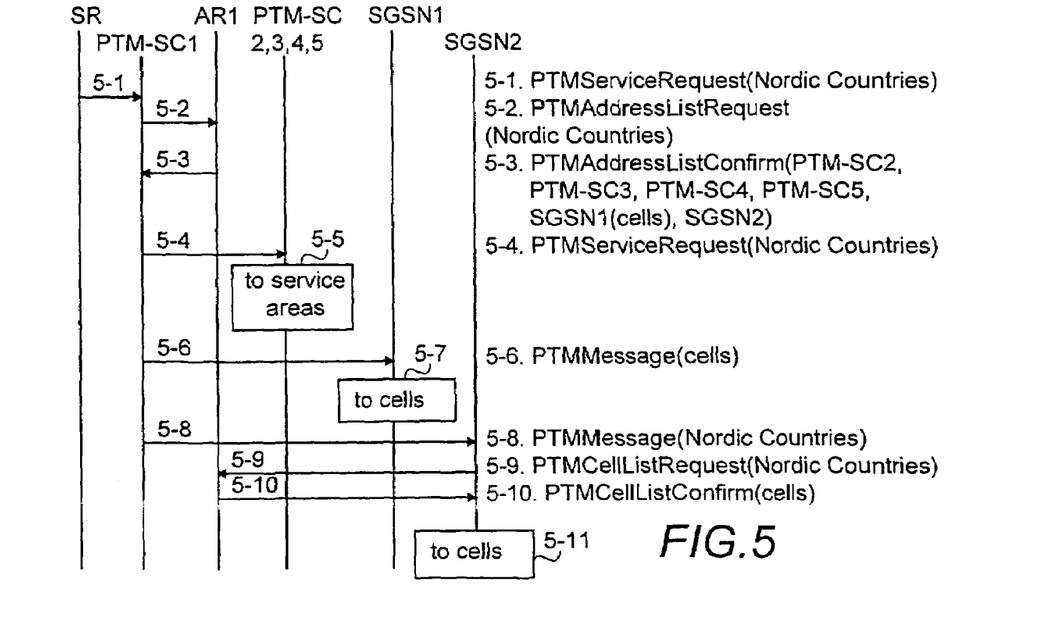
FIG. 5 is a signalling diagram illustrating signalling between some network elements of the packet radio system in the first preferred embodiment of the invention.

FIG. 5 illustrates signalling according to the first preferred embodiment of the invention between network elements in a system described in FIG. 4. In step 5-1 the service centre PTM-SC1 receives from the service requester SR a service request PTMServiceRequest in which the logical name of the geographical destination area is 'Nordic countries'. In step 5-2 the PTM-SC1 sends an inquiry message PTMAddressListRequest to the area register AR1 to obtain the addresses of the network elements of the logical name 'Nordic countries'. In step 5-3 the service centre PTM-SC1 receives from the area register AR1 a reply message PTMAddressListConfirm comprising the network element addresses which are, in this example, the service centres PTM-SC2, PTM-SC3, PTM-SC4 and PTM-SC5, and the support nodes SGSN1 and SGSN2 serving the area A1-1. The reply message also comprises a cell list for the support node SGSN1, because the support node SGSN1 does not have a connection to the area register AR1. The service centre PTM-SC1 starts to process the reply. In step 5-4 the service centre PTM-SC1 sends each service centre PTM-SC2-5 included in the reply message the service request PTMServiceRequest received in step 5-1. The logical name of the destination area is still 'Nordic countries'. In step 5—5 the service centres deliver the service to their respective areas; they ask their area registers for the network element addresses corresponding to the logical name, send the service messages to the network elements concerned, and then transmit the service to the receivers. In step 5-6 the service centre PTM-SC1 sends the serving support node SGSN1 a service message PTMMessage. The service message comprises the data included in the service request received in step 5-1, and a list of the cells within the area of the serving support node SGSN1 to which the service is to be transmitted. In step 5-7 the SGSN1 uses the base station system to send the service message data to the service receivers via the cells in the list that are within its area. In step 5-8 the service centre PTM-SC1 sends the serving support node SGSN2 a service message PTMMessage, which includes the data of the service request received in step 5-1 and the logical name 'Nordic countries' of the destination area. In step 5-9 the serving support node SGSN2 sends an inquiry message PTMCellListRequest to the area register AR1 to find out the cells within its service area that are covered by the geographical area of the logical name 'Nordic countries' of the service request. In step 5-10 the serving support node SGSN2 receives a cell list in a reply message PTMCellListConfirm from the area register AR1. In step 5-11 the serving support node SGSN2 uses the base station system to send the service message data to the service receivers via the cells within its area.

In the second preferred embodiment the message received in step 5-3 comprises the logical name of a subset corresponding to a logical name given in connection with the serving PTM service centre. The reply message could be, for example, the following: PTMAddressListConfirm ( . . . , PTM-SC2 (Lapland), PTM-SC4(Sweden). . . ). In step 54 the service centre PTM-SC1 sends each service centre PTM-SC2-5 included in the reply message the service request PTMServiceRequest received in step 5-1. Before the service request is sent, the logical name of the destination area is replaced by the logical name of the corresponding subset. For example, a PTMServiceRequest message with Lapland as the destination area is sent to the service centre PTM-SC2, whereas the destination area of the PTMServiceRequest message to be sent to the service centre PTM-SC4 is Sweden. Otherwise the signalling in the second preferred embodiment does not differ from that of the first preferred embodiment.

The steps described above in connection with FIG. 5 are not in an absolutely chronological order; some of them can take place simultaneously or in another order, as for example the steps 5-4, 5-6 and 5-8. The names of the signalling messages can differ from those given above, without the data transmitted in the messages being changed. The signalling messages to be selected from among those shown in FIG. 5 and the network elements they are to be sent to fully depend on the destination area and on the data associated with the destination area in the area register. The messages can also comprise more information than in the above description. The information transmitted in one signalling message as shown in FIG. 5 can also be transmitted using a plural number of messages. For example, in a PTM multicast transmission the service request PTMServiceRequest is a single signalling message comprising the geographical destination area and the data to be transmitted. In a PTM group transmission, the service request PTMServiceRequest comprises a plural number of signalling messages, one of the messages containing information that allows the destination area to be determined. In a group transmission data can be sent in various different messages. Correspondingly, if the area register is integrated into the PTM service centre and/or part of it is placed in the serving support nodes, the inquiry messages sent to the area register and the reply messages sent by it belong to internal data transmission within the network element concerned; they are not signalling messages to be sent in the network.

Figure 6:
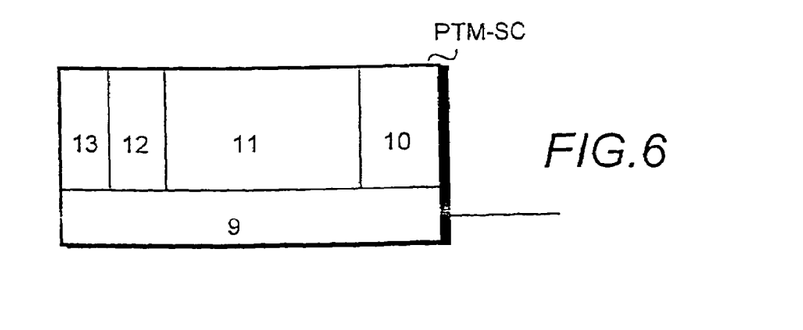
FIG. 6 is a block diagram illustrating the most essential elements of a point-to-multipoint service centre of the invention.

FIG. 6 is a block diagram illustrating the essential elements of the point-to-multipoint transmission service centre PTM-SC of the invention. The service centre PTM-SC comprises a connection part 9 for transmitting various messages to the network and from there to different parts of the service centre; reception means 10 for receiving service requests and service related messages; a management part 11 for processing a received service request as shown in FIG. 5, for example; and transmission means 12 for transmitting service requests and service related messages to the right network elements.

In principle the reception means 10 can receive service requests from terminals of the mobile communication system; from users of a fixed network, the Internet or a packet network; from other service centres; or via a direct connection. The reception means 10 of the service centre can alternatively be arranged to receive service requests only from particular service requesters. For example, dedicated service centres receive service requests only from service centres, and the service centre of an independent service requester can receive service requests only via a direct connection.

The management part 11 analyses the destination area indicated in the service request and takes care of the geographical routing of the request. The management part 11 is connected to the area register. The management part 11 inquires from the area register the network elements corresponding to the logical name of the destination area of the service request. After having received a reply, it provides the transmission means 12 with a routing instruction and a right message for each network element, as shown in FIG. 5. Depending on the embodiment, it either keeps the logical name of the destination area unchanged or replaces it with another logical name obtained from the area register's reply.

If the destination area given in the service request is a list of cells, the management part 11 provides service related messages directly for transmission means for transmission to the cells included in the list. Alternatively, the management part 11 can check from the area register the cells that belong to its service area and those that belong to the service area of another service centre. The transmission means 12 are then provided with service messages for transmission to the cells within the service area of the service centre concerned and with a service request, including a list of cells, for transmission to a second service centre. Before supplying the service request to the transmission means, the management part 11 can remove the cells belonging to its area from the cell list given in the service request.

In addition to the above, the management part 11 can take care of quality of service, scheduling, and management of subscriber information. The management part 11 can also check from a subscriber data register, such as a home location register, certain subscriber-specific characteristics, for example transmission times and restrictions, if any, concerning a distribution area.

The transmission means 12 of the service centre PTM-SC are responsive to the management part. They forward service related messages and service requests towards the correct addresses. Since the GRPS supports various different transmission protocols, the transmission means 12 know the correct protocols to be used for sending messages and service requests.

Service centres can also be integrated with each other in order to balance their load. In such case one of the service centres is the main service centre, the other service centres being sub-service centres. At least one sub-service centre must be provided in this embodiment. The sub-service centre need not be a dedicated service centre, and part of its service area can be outside the service area of the main service centre. What is essential about integrated service centres is that two service areas include a portion providing common service area, referred to as a transferable service area in this context. The main service centre comprises load control means 13 receiving information about the load of the sub-service centres and computing load differences. When a load difference between two service centres reaches a threshold value predetermined by the operator, the control means command the area register to transfer the transferable service area to belong to the service area of the service centre with a smaller load. The load control means 13 can be arranged to inquire load information at predetermined intervals. The sub-service centres comprise transmission means for load information (not shown in the Figure) which transmit information concerning their load continuously, at predetermined intervals or when inquired by the main service centre, depending on the embodiment in question. The main service centre does not necessarily have a separate service area. Instead, it can be a service centre receiving all service requests and distributing them to dedicated sub-service centres.

It is to be understood that the above description and the related drawings are only intended to illustrate the present invention. It will be apparent to those skilled in the art that many variations and modifications can be made to the invention without departing from the scope and spirit of the invention disclosed in the accompanying claims.

The invention claimed is:

1. A mobile communication system comprising at least one mobile communication network; at least one service center for point-to-multipoint services; and one or more network nodes through which a point-to-multipoint service is transmitted to cells within the service area of the network node, wherein the system comprises defining means for defining geographical destination areas of the point-to-multipoint service, each geographical destination area of the point-to-multipoint service being indicated in the system as a predetermined logical name included in a service request of the point-to-multipoint service, wherein a destination area includes cells within the service area of at least two different network nodes, and memory means for mapping each logical name corresponding to a geographical destination area of the point-to-multipoint service to one or more network element addresses of the system, and the at least one service center is arranged to inquire, in response to a received service request, from the memory means the addresses of the network elements corresponding to the logical name in the received service request, and to transmit the point-to-multipoint service via the network elements to cells belonging to the geographical destination area of the point-to-multipoint service.

2. The mobile communication system according to claim 1, wherein the service center is also arranged to check whether the network element address is the address of a second service center and, if yes, to transmit the service request to the second service center.

3. The mobile communication system according to claim 2, wherein the memory means are arranged to link to the address of the second service center associated with the logical name a second logical name corresponding to the logical name in the service area of the second service center, and the service center is arranged to replace the logical name given in the service request with said second logical name before the service request is transmitted to the second service center.

4. The mobile communication system according to claim 1, wherein the logical name of the destination area can be determined by means of at least two logical names and their intermediate logical operator, the logical operator indicating how the areas of the logical names relate to each other, and the memory means are arranged to map the logical name of the destination area that is formed by the two or more logical names and the intermediate logical operator between successive names to one or more network element addresses of the system.

5. A method for transmitting a point-to-multipoint service of a mobile communication system to a geographical destination area of the point-to-multipoint service, the mobile communication system comprising at least one mobile communication network, at least one service center for point-to-multipoint services, and at least one network node through which the point-to-multipoint service is transmitted to cells within its service area, the method comprising the steps of:
defining logical names for geographical destination areas of the point-to-multipoint service, where a destination area includes cells within the service area of at least two different network nodes;
maintaining an address list for each logical name in the mobile communication system, the address list being used for mapping the defined logical names to one or more network element addresses of the system;
receiving a service request at a first service center, the service request including a logical name;
mapping the logical name by means of the address list to one or more network element addresses belonging to the geographical destination area of the point-to-multipoint service, and
transmitting the service via the network elements to cells within their service area.

6. The method according to claim 5, the method comprising the steps of:
checking the address of each network element;
if the address is an address of a second service center, forwarding the service request to it; and
if the address is a network node address, transmitting the service via the node to those cells in the service area of the node that belong to the destination area of the service.

7. The method according to claim 5, the method comprising the steps of:
determining at least one logical operator for indicating the destination area by using at least two different logical names and their intermediate logical operator;
mapping each logical name to one or more network element addresses; and
combining the network element addresses as determined by the logical operator.

8. An area register which forms part of a mobile communication system comprising at least one network, the network comprising a service center for point-to-multipoint services for transmitting a point-to-multipoint service to a geographical destination area indicated in a service request, the destination area being indicated as a logical name included in the service request, wherein the area register comprises:
a list of logical names corresponding to geographical destination areas of the point-to-multipoint service for at least one service center, where a destination area may includes cells within the service area of at least two different network nodes, and at least one network element address list of the system corresponding to each logical name, in order to allow a logical name to be mapped to at least one system network element address within the geographical destination area of the point-to-multipoint service; and
processing means for receiving inquiries concerning the logical names and for replying to the inquiries.

9. The area register according to claim 8, wherein the processing means are arranged to
identify logical operators and
map the logical name of a destination area formed by two or more logical names and an intermediate logical operator between successive names to one or more network element addresses of the system.

10. The area register according to claim 8, wherein at least one logical name is divided into logical names of a lower hierarchical level so that the geographical destination area of the logical name of the higher hierarchical level is formed of the geographical destination areas of the logical names of the lower hierarchical level.

11. The area register according to claim 8, comprising updating means for adding logical names to and for removing them from the list of logical names and for adding network element addresses to and for removing them from the network element address list.

12. A service center for transmitting point-to-multipoint services in a mobile communication system to a geographical destination area of the service, the service center comprising
reception means for receiving a service request, the service request including a logical name indicating a destination area of the point-to-multipoint service,
that includes cells within the service area of at least two different network nodes,
inquiry means for mapping the logical name given in the service request to at least one network element address of the system, and
transmission means for transmitting the service to cells belonging to the geographical destination area of the point-to-multipoint service via each network element.

13. The service center according to claim 12, comprising:
control means for checking whether a network element is a second service center; and
if yes, the transmission means are arranged to forward the service request to the second service center.

14. The service center according to claim 12, comprising:
load means for monitoring the load of the service center itself and that of the second service center; and
determining means responsive to the load means for re-determining the service area of the second service center.

* * * * *